United States Patent
Sterner

(10) Patent No.: US 6,557,539 B2
(45) Date of Patent: May 6, 2003

(54) PROCESS FOR CONTROLLING AN INTERNAL COMBUSTION ENGINE WITH TURBOCHARGER AND EXHAUST GAS TEMPERATURE REGULATION

(75) Inventor: Andreas Sterner, Korntal-Muenchingen (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 09/960,395

(22) Filed: Sep. 24, 2001

(65) Prior Publication Data

US 2002/0035991 A1 Mar. 28, 2002

(30) Foreign Application Priority Data

Sep. 22, 2000 (DE) .......................................... 100 47 012

(51) Int. Cl.⁷ .............................................. F02D 41/00
(52) U.S. Cl. ........................................ 123/676; 60/602
(58) Field of Search ................................ 123/676, 677, 123/679, 681, 687, 559.1, 559.2; 701/109, 110, 104; 60/602, 285

(56) References Cited

U.S. PATENT DOCUMENTS

| | | | | |
|---|---|---|---|---|
| 3,595,013 A | * | 7/1971 | Brille et al. | 60/599 |
| 4,279,235 A | * | 7/1981 | Flaig et al. | 123/568.21 |
| 4,635,609 A | * | 1/1987 | Seppen et al. | 123/698 |
| 6,196,183 B1 | * | 3/2001 | Bauer et al. | 123/295 |
| 6,247,457 B1 | * | 6/2001 | Mallebrein | 123/520 |

FOREIGN PATENT DOCUMENTS

| | | | | |
|---|---|---|---|---|
| DE | 195 19 381 A1 | 11/1996 | | |
| DE | 19741565 | * 4/1999 | | F02D/41/00 |

* cited by examiner

*Primary Examiner*—Henry C. Yuen
*Assistant Examiner*—Hai H. Huynh
(74) *Attorney, Agent, or Firm*—Crowell & Moring LLP

(57) ABSTRACT

A process for controlling an internal combustion engine having a regulated turbocharger and integrated exhaust gas temperature is provided. The maximum cylinder filling capacity (rlmax) is taken from a stored characteristic field, which extends over the rpm (n) range. The values stored in the characteristic field are determined in the application and are standardized to a lambda value which can be preset, preferably to be lambda=1. When operating the internal combustion engine, the value of the maximum filling capacity (rlmax) taken from the characteristic field is corrected to the current fuel mixture composition.

7 Claims, 2 Drawing Sheets

PROCESS FOR CONTROLLING AN INTERNAL COMBUSTION ENGINE WITH TURBOCHARGER AND EXHAUST GAS TEMPERATURE REGULATION

This application claims the priority of German Patent Document 100 47 012.2, filed Sep. 22, 2000, the disclosure of which is expressly incorporated by reference herein.

BACKGROUND AND SUMMARY OF THE INVENTION

The invention relates to an internal combustion engine with turbocharger and exhaust gas temperature regulation, wherein the torque is adjusted so that the full-load torque desired by the driver and, at the same time, a fuel consumption that is as low as possible, are obtained even under changed operating conditions.

The problematic and the influence of the load pressure on the engine torque or the changes of the available torque when a change of the operating conditions occurs is already known from German published patent application 195 19 381. A device is described therein, which controls or regulates the engine torque depending on a multitude of influence variables in such a way that the device lowers the load pressure depending on a preset desired engine torque when the desired engine torque, or a desired operating variable of the engine connected therewith, is less than a corresponding given operating variable of the engine without intervention on the load pressure. By utilizing a preset desired engine torque as a control or regulation variable for the engine torque, a multitude of vehicle influence variables can be taken into consideration. It is also designed so that the reduction of filling in the cylinders produced by the load pressure drop has as a consequence a drop of the exhaust gas temperature.

Essential criteria for controlling the different operating cycles of an internal combustion engine are a high driving comfort together with a fuel consumption that is as low as possible, and an improvement of the environmental compatibility. In internal combustion engines with turbocharged engines, the exhaust gas temperature regulation is one possibility of meeting these requirements. In systems with exhaust gas temperature regulation, the engine is usually operated with a stoichiometric mixture until a maximum permissible temperature is reached. After exceeding a defined temperature limit value, a mixture enrichment is undertaken, which keeps constant or lowers the exhaust gas temperature and, as a consequence, the temperature of the components via the open circuit cooling which takes place. As a rule, the mixture enrichment effects an increase of the available torque.

The process according to the invention has the advantage that, in internal combustion engines with turbocharger and exhaust gas temperature regulation, the maximum torque remains constant independently from the mixture composition, and therefore the driving performance and the driving comfort are fully maintained. The inclusion of the lambda efficiency factor in the determination of the control variables, and especially in the determination of the filling capacity, effects an optimal tuning of the consumption-optimized operation.

Further advantageous improvements of the process according to the invention are possible via the measures described herein.

The respective operating conditions are taken into consideration because the correction of the maximum filling capacity (rlmax) taken from the characteristic field is carried out by forming the quotient from the maximum filling capacity (rlmax) taken from the characteristic field and the value for the lambda efficiency factor (ETA-LAM) and a value for the corrected filling capacity (rl-korr) is obtained as a result.

A weighing of the value for the corrected filling capacity based on further demands placed on the internal combustion engine such as, for example, knock control and limiting stages, and the corresponding modification also have the advantage of controlling the operation of the internal combustion engine as optimally as possible in accordance with the current requirements.

The embodiments of the invention are shown in the drawings, which are described in more detail in the following, and wherein:

Other objects, advantages and novel features of the present invention will become apparent from the following detailed description of the invention when considered in conjunction with the accompanying drawings.

DETAILED DESCRIPTION OF THE DRAWINGS

Figure 1:
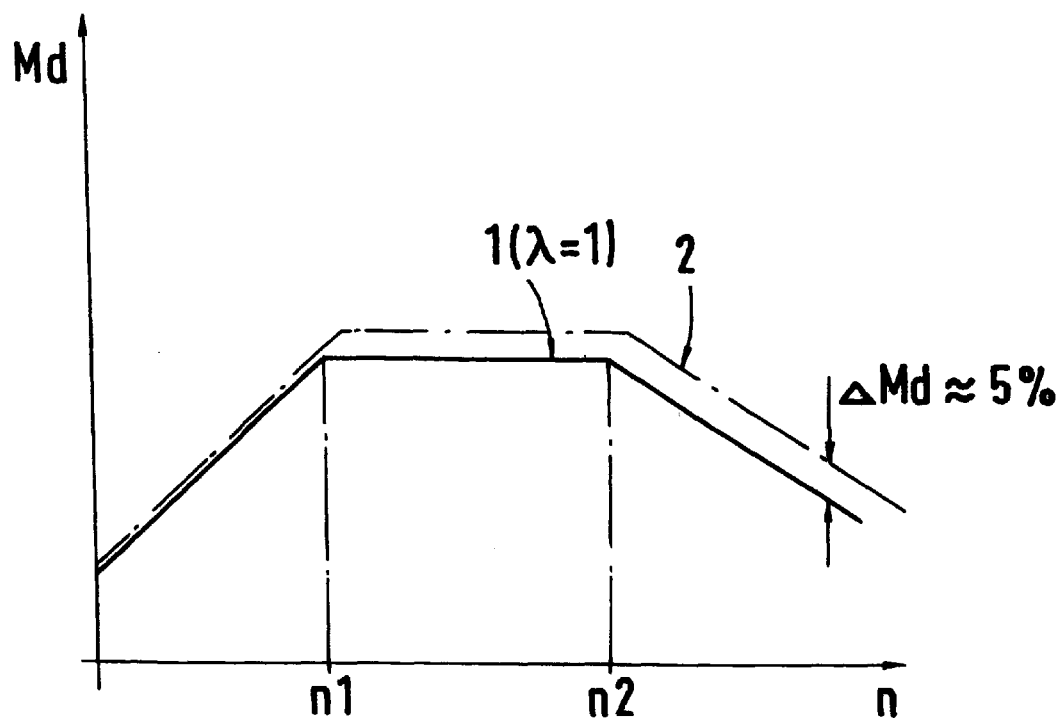
FIG. 1 is a graphical diagram representing the interrelationship between the rpm, torque, and mixture enrichment for the exhaust gas temperature regulation.

In FIG. 1, the interrelationship between the engine rpm n, torque Md, and mixture enrichment for an exhaust gas temperature regulation is shown in a diagram in the form of a characteristic line. Herein, the rpm n is recorded on the abscissa and the torque Md is recorded on the ordinate. A first curve 1, shown here as a continuous line, illustrates the operation of the internal combustion engine at a value of lambda=1. With regard to the exhaust gas, the value lambda=1 is the optimal operating point for an almost complete combustion and leads therefore to very good exhaust gas values. The curve 2, shown here as a chain line, illustrates the operation of the internal combustion engine over the same rpm range with a lambda value of approximately 0.85.

Figure 2:
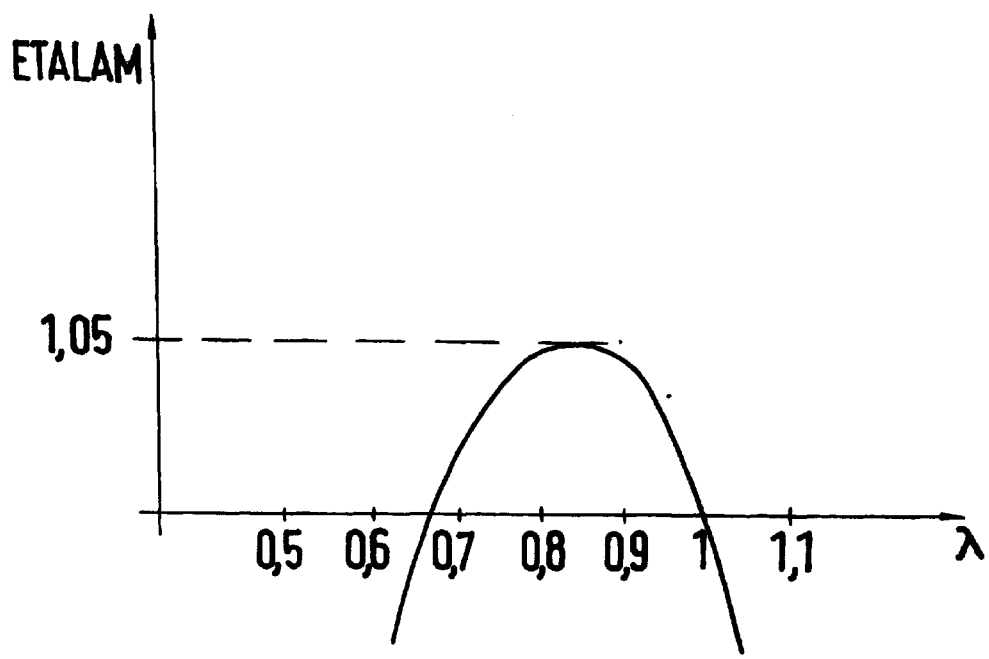
FIG. 2 is a graphical diagram showing the lambda efficiency factor in dependence upon the set lambda value.

The change of the lambda efficiency factor ETA-LAM depending upon the lambda value is shown in FIG. 2. In FIG. 2, it can be seen that the efficiency factor ETA-LAM is greatest with a lambda value of 0.8 to 0.9. Therefore, there arises the need to determine control variables for the operation of an internal combustion engine that meet the two requirements of lambda=1 for very good exhaust gas values and of lambda=0.8 . . . 0.9 for optimal torque.

The result is an interaction between the requirements and characteristics of an internal combustion engine, so that an optimal efficiency factor is reached, and at the same time the danger of an unacceptable exhaust gas temperature increase is reduced. In both curves it can be seen that the torque Md in a lower rpm range increases up to a first rpm n1 and, after reaching the rpm n1, remains essentially constant. The rpm n1 is the rpm starting at which the turbocharger must reduce the pulse duty factor to set the desired full-load torque. After a second rpm value n2 is exceeded, the torque curve drops off again. The characteristic of the torque curves is a result of the control variables, which can be output by the operating parameters, wherein the cylinder filling capacity is a governing variable for the torque Md. The value for the cylinder filling is taken from a characteristic field, which was determined, for example, on a test stand in the application. The chain line of the curve 2 shows the characteristic of the torque over the rpm when the exhaust gas temperature regulation is active and undertakes a mixture enrichment. In this curve, the torque Md also increases (as was already mentioned) up to the first rpm n1.

Figure 3:
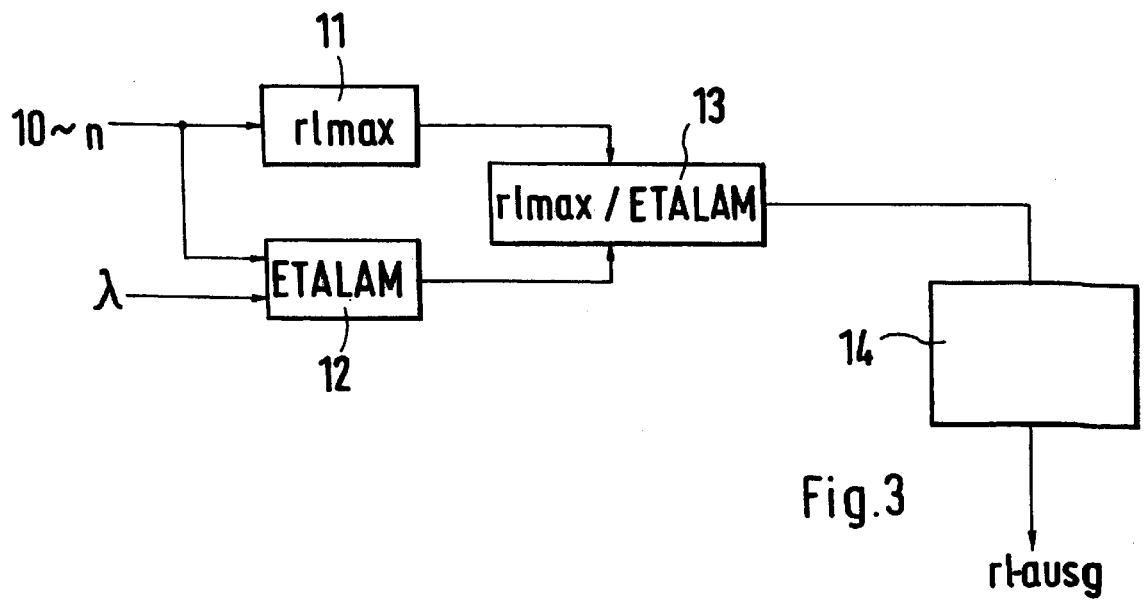
FIG. 3 is a block diagram providing an overview in principle of the link between the mixture enrichment for an exhaust gas temperature regulation and the lambda efficiency factor.

FIG. 3 shows a schematic overview of the link between the filling calculation and the lambda efficiency factor. Here, the rpm n is fed as an input variable to a function block 11 and a function block 12. In addition, the value lambda is also fed as an input variable to the function block 12. The maximum cylinder filling capacity is determined in the function block 11 on the basis of the operating parameters. This value of the maximum cylinder filling capacity rlmax is taken from a stored characteristic field, which is arranged in the control unit. This characteristic field (as already mentioned above) was determined in the application. In order to use the characteristic field in all operating points, the characteristic determined in the application is standardized to a value lambda=1 and is then corrected in the operation of the motor vehicle in correspondence with the current operating conditions, after an evaluation of the lambda values has been carried out. In the function block 12, the lambda efficiency factor ETA-LAM is taken from a lambda efficiency factor characteristic field. The values for the maximum cylinder filling rlmax and for the lambda efficiency factor ETA-LAM determined in this way are fed to a divider stage 13 and from there they are forwarded to an output unit 14. This output unit 14 can contain, for example, a limiting stage and/or carry out a validity check of the transmitted value for the filling capacity. If required, a fault can be recognized via the validity check, and the output of an uncritical value for an emergency operation can take place. Finally, the output unit 14 outputs the evaluated value of the cylinder filling rl-ausg corresponding to the actual operating conditions for regulating the turbocharger to the peripheral unit. To protect the turbocharger from exhaust gases at high temperatures, the fuel-air mixture is enriched and/or the load pressure is reduced to lower the temperature of the exhaust gas.

Figure 4:
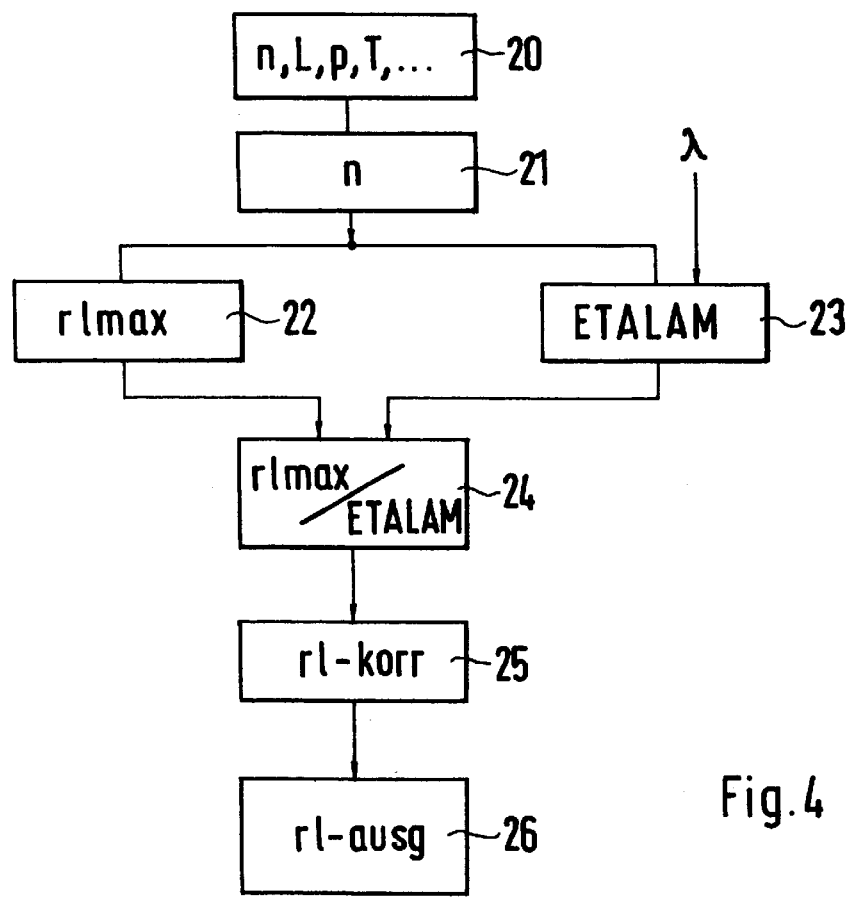
FIG. 4 is a flow chart illustrating the process according to the invention.

In FIG. 4, the particular process steps are shown in an overview limited to the steps which are essential for the process. In a first process step 20, the current operating parameters such as load, temperature, pressure, and the like are recorded. For the further process steps, the rpm n is processed in the following process step 21. The now available variable of the rpm n corresponds to the input value 10 of FIG. 3. The rpm value n is fed in parallel to the process 22 and 23. In the process step 22, the maximum allowable filling capacity rlmax is read out from the characteristic field, which is correspondingly stored and standardized to lambda=1. Simultaneously, in the process step 23, the lambda efficiency factor ETA-LAM is also determined together with the inputted variable lambda. Both values are then fed to a process step 24, in which the value of the maximum cylinder filling capacity rlmax is divided by the value of the lambda efficiency factor ETA-LAM. As a the result of this division, in an additional work step 25, the corrected filling capacity rl-korr is made available for the maximum possible torque. In addition, in process step 26, the evaluation or weighting of this corrected value of the filling capacity rl-korr takes place in view of other requirements, so that the value of the filling capacity rl-ausg to be outputted is available as a result of the process step 26.

In principle it can be stated that when there is a full-load demand by the driver, the engine control attempts to set the full-load torque independently from the environmental conditions, wherein the cylinder filling necessary for reaching the desired torque at a fixed ignition angle is plotted on a full-load characteristic line over the rpm specific to a stoichiometric mixture. In systems with exhaust gas temperature regulation, the necessary maximum cylinder filling can be corrected taking into consideration the air conditions, since otherwise a torque loss of up to 5% can be recorded at full load in stoichiometric operation.

When determining the maximum cylinder filling rl specific to the lambda value=1, the maximum cylinder filling is to be lowered under full-load requirement with mixture enrichment via the regulation of the exhaust gas temperature.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for controlling a turbocharged internal combustion engine having integrated exhaust gas temperature regulation, the process comprising the acts of:

selecting a maximum cylinder filling capacity (rlmax) from a stored characteristic field, wherein the stored characteristic field extends over an rpm (n) range, and wherein values stored in the characteristic field are determined in advance and are standardized to a presettable lambda value; and during operation of the internal combustion engine, correcting the selected maximum cylinder filling capacity from the stored characteristic field with respect to a current fuel mixture composition.

2. The process according to claim 1, wherein the act of correcting the selected maximum cylinder filling capacity comprises the acts of:

forming a quotient of the selected maximum cylinder filling capacity from the stored characteristic field and a value of a lambda efficiency factor; and providing the quotient as a resultant value for the corrected filling capacity.

3. The process according to claim 2, further comprising the act of modifying the corrected filling capacity based on demands placed on the internal combustion engine; and outputting a further corrected filling capacity value differing from the corrected filling capacity.

4. The process according to claim 3, wherein the presettable lambda value is 1.

5. The process according to claim 3, wherein said demands placed on the internal combustion engine include at least knock control demands and limiting stages demands.

6. The process according to claim 2, wherein the presettable lambda value is 1.

7. The process according to claim 1, wherein the presettable lambda value is 1.

* * * * *